(12) United States Patent
Ohishi

(10) Patent No.: US 7,359,462 B2
(45) Date of Patent: Apr. 15, 2008

(54) CHANNEL SEARCH DEVICE

(75) Inventor: Syouji Ohishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 845 days.

(21) Appl. No.: 10/677,335

(22) Filed: Oct. 3, 2003

(65) Prior Publication Data
US 2004/0076243 A1    Apr. 22, 2004

(30) Foreign Application Priority Data
Oct. 4, 2002   (JP) .............................. 2002-291878

(51) Int. Cl.
*H04L 27/14* (2006.01)
(52) U.S. Cl. ..................................... 375/326
(58) Field of Classification Search ................ 375/326, 375/219, 354; 455/53.1; 348/607
See application file for complete search history.

(56) References Cited

U.S. PATENT DOCUMENTS 5,602,601 A * 2/1997 Kim et al. ................. 348/607
6,389,082 B1   5/2002 Takigawa et al.
6,628,923 B1 * 9/2003 Eriksson .................... 455/63.1
6,879,626 B1 * 4/2005 Sudo ......................... 375/219

FOREIGN PATENT DOCUMENTS

JP    2001137778 A  *  5/2001

\* cited by examiner

*Primary Examiner*—Khai Tran
(74) *Attorney, Agent, or Firm*—Staas & Halsey LLP

(57) ABSTRACT

A channel search device is provided, which includes: a quasi-synchronization quadrature detector for outputting an I-axis signal and a Q-axis signal obtained by performing quasi-synchronization quadrature detection, based on the carrier frequency set value, on a PSK modulation signal; a timing reproducer for reproducing and outputting the I-axis signal and the Q-axis signal while correcting an error of the symbol rate set value; and a dispersion detector for detecting a dispersion between the amplitude of a symbol, comprising the I-axis signal and the Q-axis signal, and a reference amplitude. The channel search device monitors the above-described dispersion while varying the carrier frequency set value and the symbol rate set value, and judges that a channel of the symbol rate set value at the present time exists at the position of the carrier frequency set value when the size of the dispersion detected by the dispersion detector becomes an extremal value.

23 Claims, 14 Drawing Sheets

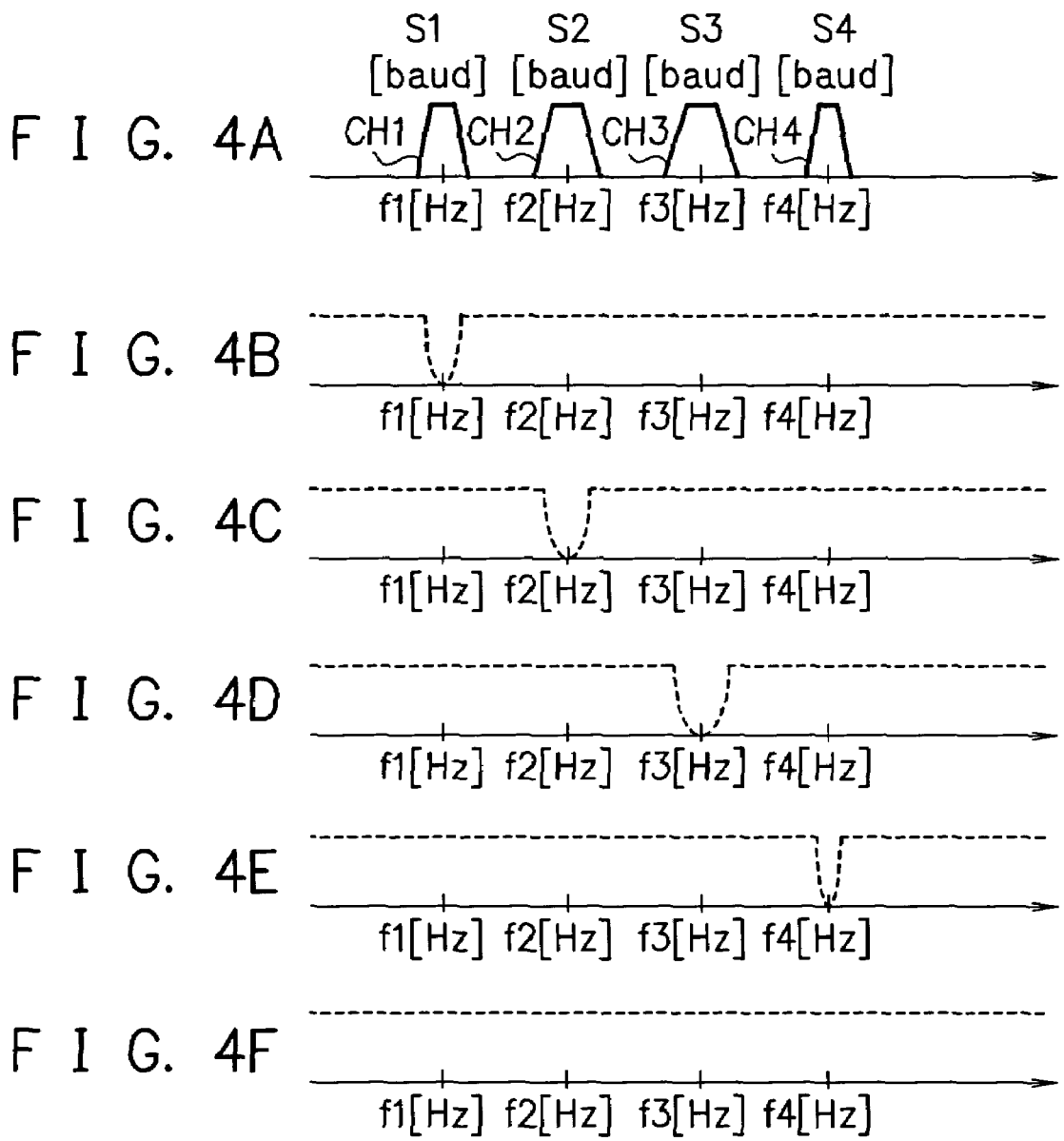

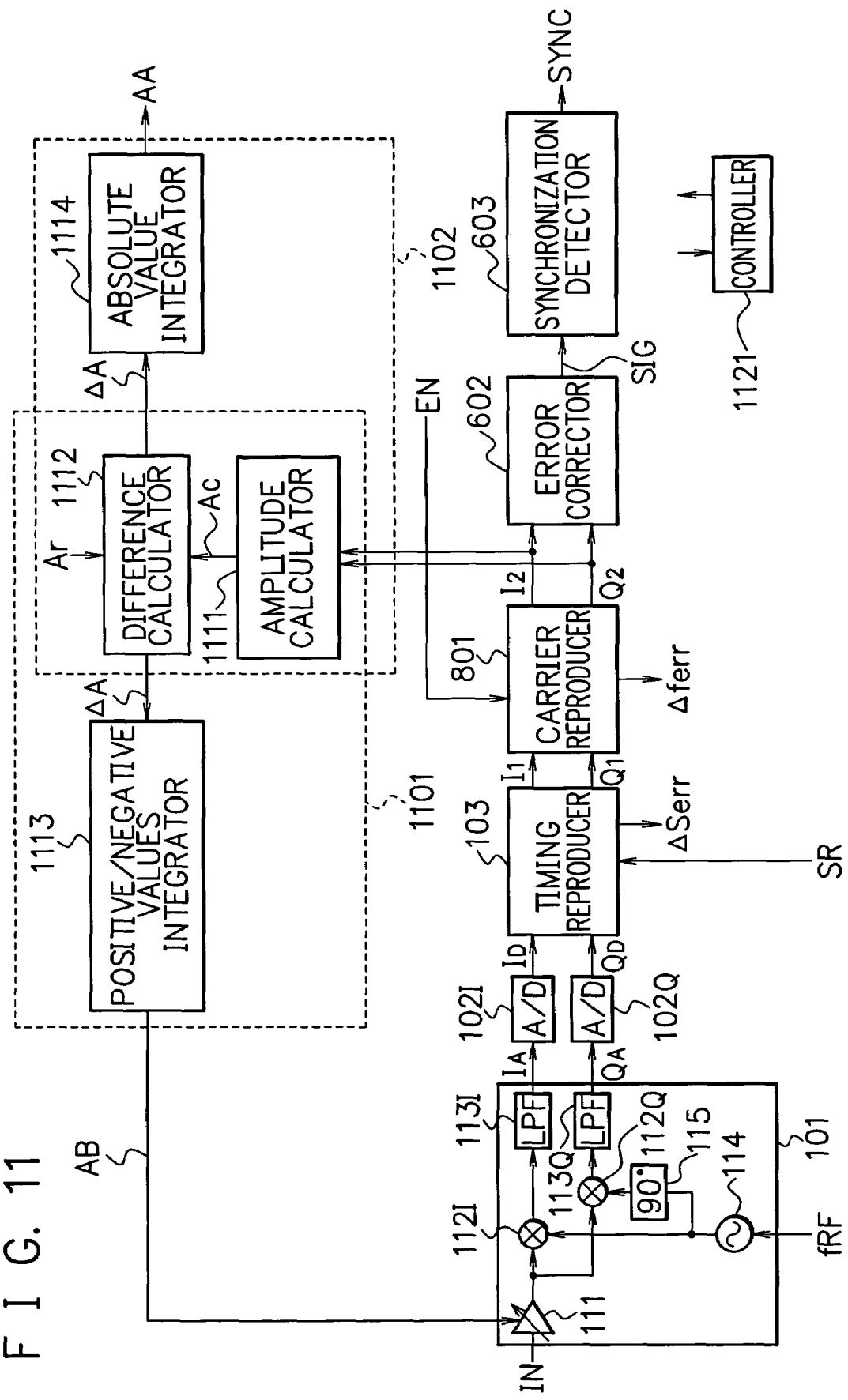
F I G. 11

F I G. 12
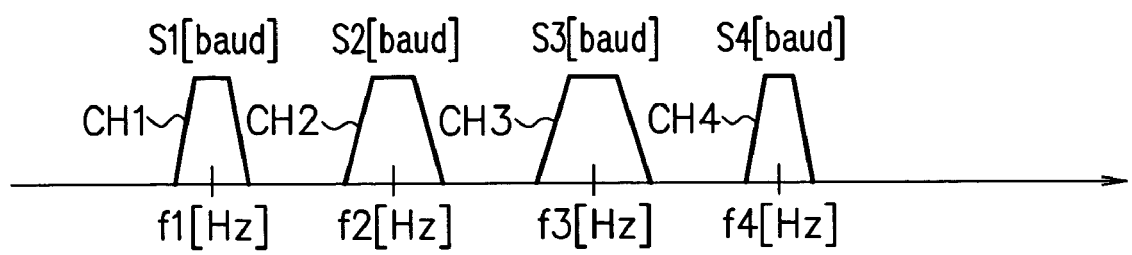
F I G. 13
| CHANNEL | 1 | 2 | 3 | 4 |
|---|---|---|---|---|
| CARRIER FREQUENCY SET VALUE [Hz] | f1 | f2 | f3 | f4 |
| SYMBOL RATE SET VALUE [Baud] | S1 | S2 | S3 | S4 |

CHANNEL SEARCH DEVICE

CROSS-REFERENCE TO RELATED APPLICATIONS

This application is based upon and claims the benefit of priority from the prior Japanese Patent Application No. 2002-291878, filed on Oct. 4, 2002 the entire contents of which are incorporated herein by reference.

BACKGROUND OF THE INVENTION

1. Field of the Invention

The present invention relates to a channel search device, and particularly relates to a channel search device for searching a channel in an n-phase PSK (phase shift keying) modulation signal, which is used for digital satellite broadcasting or the like.

2. Description of the Related Art

FIG. 12 shows an example of a channel distribution in a PSK modulation signal. A first channel CH1 has a carrier frequency of f1 (Hz) and a symbol rate of S1 (baud). A second channel CH2 has a carrier frequency of f2 (Hz) and a symbol rate of S2 (baud). A third channel CH3 has a carrier frequency of f3 (Hz) and a symbol rate of S3 (baud). A fourth channel CH4 has a carrier frequency of f4 (Hz) and a symbol rate of S4 (baud).

To demodulate the PSK modulation signal, it is necessary to set carrier frequencies and symbol rates according to each channel. For example, when it is known in advance that there are four channels CH1 to CH4 to be inputted as shown in FIG. 12, a channel selecting operation after setting the channels is smoothly performed if channel information (carrier frequencies and symbol rates) is incorporated in a PSK modulator in advance as shown in FIG. 13.

FIG. 14 shows the configuration of a PSK demodulator (channel search device) according to a prior art. A quasi-synchronization quadrature detector 1401 includes an amplifier 1411, multipliers 1412I and 1412Q, low pass filters 1413I and 1413Q, an oscillator 1414, and a 90-degree phase shifter 1415. The amplifier 1411 amplifies, according to a gain control signal AB outputted by a gain controller 1404, a PSK modulation signal IN, and outputs it to the multipliers 1412I and 1412Q. The oscillator 1414 generates, according to a carrier frequency set value fRF, a cosine wave, and outputs it to the multiplier 1412I. Here, the carrier frequency set value fRF is set in such a manner that, for example, when channels CH1 to CH4 are selected, frequencies f1 to f4 are respectively set. The 90-degree phase shifter 1415 shifts a phase of the cosine wave generated by the oscillator 1414 by 90 degree, and outputs a sine wave to the multiplier 1412Q.

The multiplier 1412I multiplies the PSK modulation signal and the sine wave. The PSK modulation signal IN is represented by the following formula.

$$IN = I \cos \omega t + Q \sin \omega t$$

The low pass filter 1413I only lets a low frequency constituent in the output of the multiplier 1412I pass therethrough, and outputs an I-axis signal IA.

The multiplier 1412Q multiplies the PSK modulation signal and the cosine wave. The low pass filter 1413Q only lets a low frequency constituent in the output of the multiplier 1412Q pass therethrough, and outputs a Q-axis signal QA.

The quasi-synchronization quadrature detector 1401 performs quasi-synchronization quadrature detection on the PSK modulation signal, and outputs an I-axis signal IA and a Q-axis signal QA. FIG. 15A shows the I-axis signal and the Q-axis signal in a four-phase PSK modulation signal. In the four-phase PSK modulation, these signals can take four states on a reference circle. FIG. 15B shows the I-axis signal and the Q-axis signal in a two-phase PSK modulation signal, which can take two states on the reference circle. The FIG. 15C shows the I-axis signal and the Q-axis signal in an eight-phase PSK modulation signal, which can take eight states on the reference circle.

An A/D converter 1402I converts the I-axis signal IA in an analog format to an I-axis signal ID in a digital format. An A/D converter 1402Q converts the Q-axis signal QA in an analog format to a Q-axis signal QD in a digital format.

A timing reproducer 1403 reproduces the I-axis signal ID and the Q-axis signal QD while correcting an error of a symbol rate SR, outputs an I-axis signal I1 and a Q-axis signal Q1, and detects and outputs a displacement amount ΔSerr of the symbol rate SR. Here, the symbol rate SR is set in such a manner that, for example, when channels CH1 to CH4 are selected, symbol rates S1 to S4 are respectively set.

The gain controller 1404 compares the amplitude of a symbol comprising the I-axis signal I1 and the Q-axis signal Q1 with a reference amplitude, and outputs the gain control signal AB according to the difference thereof. The amplifier 1411 amplifies the PSK modulation signal IN according to the gain control signal AB.

A carrier reproducer 1405 corrects a phase displacement of a symbol comprising the I-axis signal I1 and the Q-axis signal Q1, outputs an I-axis signal I2 and a Q-axis signal Q2, and outputs a displacement amount Δferr of the carrier frequency fRF.

An error corrector 1406 corrects an error of a symbol comprising the I-axis signal I2 and the Q-axis signal Q2, and outputs a demodulation signal SIG.

A synchronization detector 1407 performs detection of a unique word from a data row of the demodulation signal SIG, and outputs a high level as a synchronization signal SYNC when the unique word can be detected in a constant period, and outputs a low level when the unique word cannot be detected.

The PSK demodulator of FIG. 14 is incorporated in a system such as an STB (Set Top Box). The above-described carrier frequency fRF and the symbol rate SR can be set to the values of FIG. 13 in order to select respective channels CH1 to CH4.

However, when the system is used under an environment in which a change in the channel information (carrier frequencies and symbol rates) occurs, the channel information cannot be set in advance, so that it is necessary to obtain all the existing channels (a channel search), for example, when the power is turned on.

FIG. 16 is a flow chart showing processings of a channel search according to the prior art. The channel search is performed by the following procedure using the PSK demodulator of FIG. 14. First, in Step S1601, a symbol rate SR is set to S0. The symbol rate S0 is the minimum value of a symbol rate setting. Next, in Step S1602, a carrier frequency fFR is set to f0. The carrier frequency f0 is the minimum value of a carrier frequency setting. Next, in Step S1603, the system stands by for a time tDEM(s) that is necessary for the demodulation processing to be completed.

Here, the standby time tDEM is the sum total of a time necessary for the timing reproducer 1403 to complete timing reproduction, a time necessary for the carrier reproducer 1405 to complete carrier reproduction, a time necessary for the error corrector 1406 to complete error correction, and a time necessary for the synchronization detector 1407 to complete synchronization detection.

If the difference between the symbol rate SR and the symbol rate of a channel is within a pull-in range of the timing reproducer 1403, and the difference between the carrier frequency fRF and the carrier frequency of the channel is within a pull-in range of the carrier reproducer 1405, the timing reproducer 1403 corrects the difference ΔSerr between the symbol rate SR and the actual symbol rate, and the carrier reproducer 1405 corrects the difference Δferr between the carrier frequency fRF and the carrier frequency of the actual channel, so that a synchronization signal SYNC becomes high level ("H"). In other words, when the synchronization signal SYNC is high level, it means that a channel exists, and when it is low level, it means that a channel does not exist.

Next, in Step S1604, it is checked whether the synchronization signal SYNC is high level or not. If it is high level, the system proceeds to Step S1605, and if it is low level, the system proceeds to Step S1607. In Step S1605, the carrier frequency displacement amount Δferr of the carrier reproducer 1405 and the symbol rate displacement amount ΔSerr of the timing reproducer 1403 are monitored. Next, in Step S1606, SR+ΔSerr as a symbol rate and fRF+Δferr as a carrier frequency of which a channel exists are respectively stored in a memory in the system.

Next, in Step S1607, it is checked whether the carrier frequency fRF is larger than fX or not. The carrier frequency fX is the maximum value of the carrier frequency setting. If it is not larger, the system proceeds to Step S1608, and if it is larger, the system proceeds to Step S1609. In Step S1608, a frequency variation Δf is added to the set value of the carrier frequency fRF. Thereafter, the system returns to Step S1603, and repeats the above-described processings on a new carrier frequency fRF.

In Step S1609, it is checked whether the symbol rate SR is larger than SX or not. The symbol rate SX is the maximum value of the symbol rate setting. If it is not larger, the system proceeds to Step S1610, and if it is larger, the system terminates the processing. In Step S1610, a symbol rate variation ΔS is added to the set value of the symbol rate SR. Thereafter, the system returns to Step S1602, and repeats the above-described processings on a new symbol rate SR.

By this channel search, for example, the carrier frequencies and the symbol rates for the four channels shown in FIG. 13 can be obtained.

In addition, the following patent document 1 discloses a receiver for receiving a digital modulation signal such as a QPSK, and a technology for calculating a sweep frequency range of a carrier to be searched based on the transmission speed of a carrier to be selected, and performing a synchronization pull-in.

Patent Document 1

U.S. Pat. No. 6,389,082

When performing the channel search, it is necessary to wait in Step S1603 for the time tDEM(s) for each symbol rate SR and carrier frequency fRF. In the time tDEM, in particular, the time necessary for the carrier reproducer 1405 to complete carrier reproduction requires the longest time. Especially, when a reception state of the inputted PSK modulation signal IN is poor, or when the displacement between the carrier frequency fRF and an actual carrier frequency is large, it consumes much more time, which poses a problem of requiring a long period of time to complete the channel search.

SUMMARY OF THE INVENTION

An object of the present invention is to provide a channel search device capable of searching a channel in a short period of time.

According to one aspect of the present invention, provided is a channel search device that includes: a quasi-synchronization quadrature detector for inputting a PSK modulation signal and a carrier frequency set value, and outputting an I-axis signal and a Q-axis signal obtained by performing, based on the carrier frequency set value, quasi-synchronization quadrature detection on the PSK modulation signal; a timing reproducer for inputting the I-axis signal, the Q-axis signal, and a symbol rate set value, and reproducing and outputting the I-axis signal and the Q-axis signal while correcting an error of the symbol rate set value; and a dispersion detector for inputting the I-axis signal and the Q-axis signal outputted by the timing reproducer, and detecting a dispersion between the amplitude of a symbol, comprising the I-axis signal and the Q-axis signal, and a reference amplitude. This channel search device monitors the above-described dispersion while varying the carrier frequency set value and the symbol rate set value, and judges that a channel of the symbol rate set value at the present time exists at the position of the carrier frequency set value when the size of the dispersion detected by the dispersion detector becomes an extremal value.

Since it is possible to judge that a channel exists when the size of the dispersion between the amplitude of a symbol, comprising the I-axis signal and the Q-axis signal reproduced by the timing reproducer, and the reference amplitude becomes an extremal value, the channel search can be performed in a short period of time. A standby time required for judging whether a channel exists or not for a predetermined carrier frequency and symbol rate is only the time necessary for the timing reproducer to complete timing reproduction. As compared to the conventional standby time, which is the sum total of a time necessary for the timing reproducer to complete timing reproduction, a time necessary for the carrier reproducer to complete carrier reproduction, a time necessary for the error corrector to complete error correction, and a time necessary for the synchronization detector to complete synchronization detection, the present invention allows considerable reduction of the channel search time.

BRIEF DESCRIPTION OF THE DRAWINGS

FIGS. 4A to 4F are views for explaining operation of the dispersion detector;

FIG. 11 is a diagram showing the configuration of a channel search device according to a fourth embodiment of the present invention;

FIG. 12 is a view showing an example of a channel distribution in a PSK modulation signal;

FIG. 13 is a view showing channel information (carrier frequencies and symbol rates);

DETAILED DESCRIPTION OF THE PREFERRED EMBODIMENTS

First Embodiment

An example of a channel distribution in a PSK modulation signal is shown in FIG. 12. A first channel CH1 has a carrier frequency of f1 (Hz) and a symbol rate of S1 (baud). A second channel CH2 has a carrier frequency of f2 (Hz) and a symbol rate of S2 (baud). A third channel CH3 has a carrier frequency of f3 (Hz) and a symbol rate of S3 (baud). A fourth channel CH4 has a carrier frequency of f4 (Hz) and a symbol rate of S4 (baud). To demodulate the PSK modulation signal, it is necessary to set carrier frequencies and symbol rates according to each channel. For example, when it is known in advance that there are four channels CH1 to CH4 to be inputted as shown in FIG. 12, a channel selecting operation after setting the channels is smoothly performed if channel information (carrier frequencies and symbol rates) is incorporated in a PSK modulator in advance as shown in FIG. 13.

When the PSK modulator is used under an environment in which a change in the channel information (carrier frequencies and symbol rates) occurs, the channel information cannot be set in advance, so that it is necessary to obtain all the existing channels (a channel search), for example, when the power is turned on.

Figure 1:
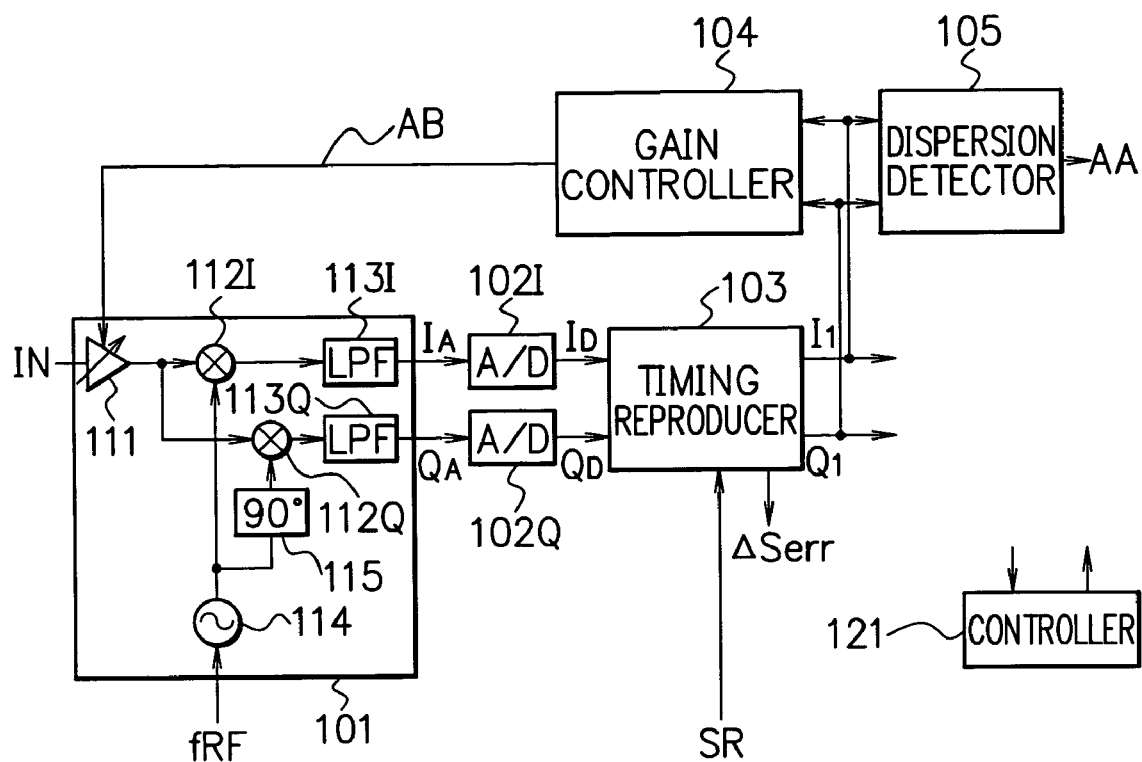
FIG. 1 is a diagram showing the configuration of a channel search device according to a first embodiment of the present invention.

FIG. 1 shows the configuration of a channel search device according to a first embodiment of the present invention. A quasi-synchronization quadrature detector 101 includes an amplifier 111, multipliers 112I and 112Q, low pass filters 113I and 113Q, an oscillator 114, and a 90-degree phase shifter 115. The amplifier 111 amplifies, according to a gain control signal AB outputted by a gain controller 104, a PSK modulation signal IN, and outputs it to the multipliers 112I and 112Q. The oscillator 114 generates, according to a carrier frequency set value fRF, a cosine wave, and outputs it to the multiplier 112I. Here, the carrier frequency set value fRF is set in such a manner that, for example, when channels CH1 to CH4 are selected, frequencies f1 to f4 are respectively set. The 90-degree phase shifter 115 shifts a phase of the cosine wave generated by the oscillator 114 by 90 degree, and outputs a sine wave to the multiplier 112Q.

The multiplier 112I multiplies the PSK modulation signal and the sine wave. The PSK modulation signal IN is represented by the following formula.

$$IN = I \cos \omega t + Q \sin \omega t$$

The low pass filter 113I only lets a low frequency constituent in the output of the multiplier 112I pass therethrough, and outputs an I-axis signal IA.

The multiplier 112Q multiplies the PSK modulation signal and the cosine wave. The low pass filter 113Q only lets a low frequency constituent in the output of the multiplier 112Q pass therethrough, and outputs a Q-axis signal QA.

Figure 15A:
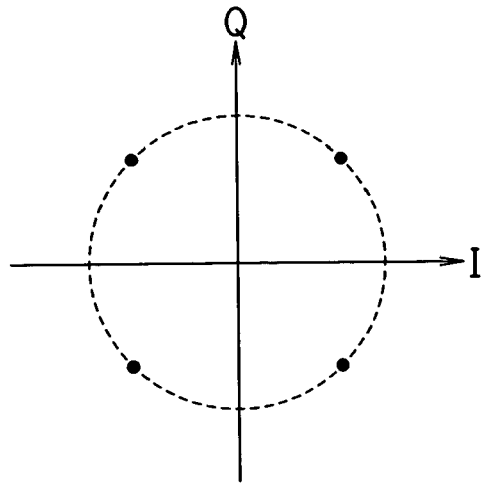
FIGS. 15A to 15C are views showing PSK modulations.
Figure 15B:
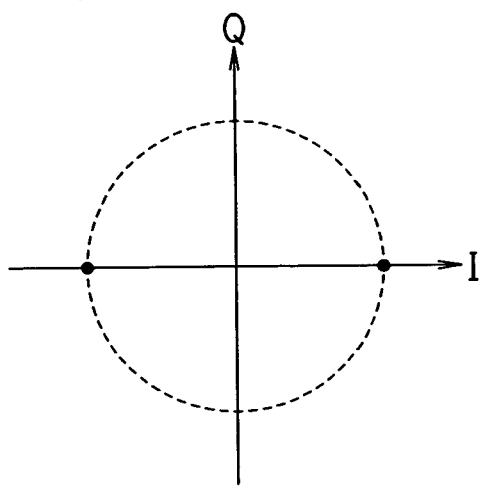
Figure 15C:
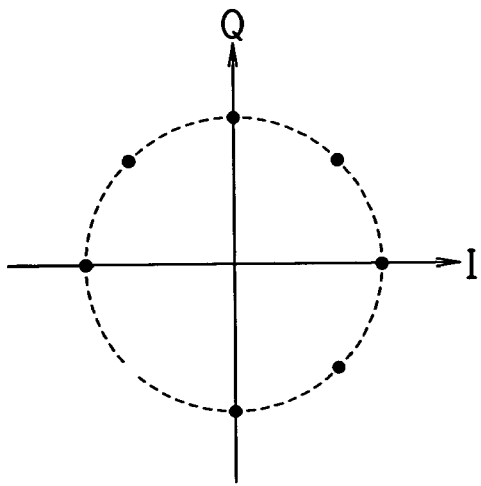

The quasi-synchronization quadrature detector 101 performs quasi-synchronization quadrature detection on the PSK modulation signal, and outputs an I-axis signal IA and a Q-axis signal QA. FIG. 15A shows the I-axis signal and the Q-axis signal in a four-phase PSK modulation signal. In the four-phase PSK modulation, these signals can take four states on a reference circle. FIG. 15B shows the I-axis signal and the Q-axis signal in a two-phase PSK modulation signal, which can take two states on the reference circle. FIG. 15C shows the I-axis signal and the Q-axis signal in an eight-phase PSK modulation signal, which can take eight states on the reference circle. The four-phase PSK modulation signal will be explained below as an example.

An A/D converter 102I converts the I-axis signal IA in an analog format to an I-axis signal ID in a digital format. An A/D converter 102Q converts the Q-axis signal QA in an analog format to a Q-axis signal QD in a digital format.

A timing reproducer 103 inputs a symbol rate SR, reproduces the I-axis signal ID and the Q-axis signal QD while correcting an error of the symbol rate SR, outputs an I-axis signal I1 and a Q-axis signal Q1, and detects and outputs a displacement amount ΔSerr of the symbol rate SR. Here, the symbol rate SR is set in such a manner that, for example, when channels CH1 to CH4 are selected, symbol rates S1 to S4 are respectively set.

The gain controller 104 compares the amplitude of a symbol comprising the I-axis signal I1 and the Q-axis signal Q1 with a reference amplitude, and outputs the gain control signal AB according to the difference thereof. The amplifier 111 amplifies, according to the gain control signal AB, the PSK modulation signal IN. Here, the reference amplitude is equivalent to the radius of the reference circles shown in FIGS. 15A to 15C.

The dispersion detector 105 inputs the I-axis signal I1 and the Q-axis signal Q1 outputted by the timing reproducer 103, and detects and outputs a dispersion AA between the amplitude of a symbol, comprising the I-axis signal I1 and the Q-axis signal Q1, and a reference amplitude. Details of the dispersion detector 105 will be explained later with reference to FIG. 2.

The controller 121 controls the above-described constituent units. Specifically, the controller 121 monitors the dispersion AA of the dispersion detector 105 while varying the carrier frequency fRF and the symbol rate SR, and when the size of the dispersion AA becomes an extremal value, it judges that a channel of the symbol rate SR+ΔSerr at the present time exists at a position of the carrier frequency fRF thereof. This will be explained in more detail below.

Figure 2:
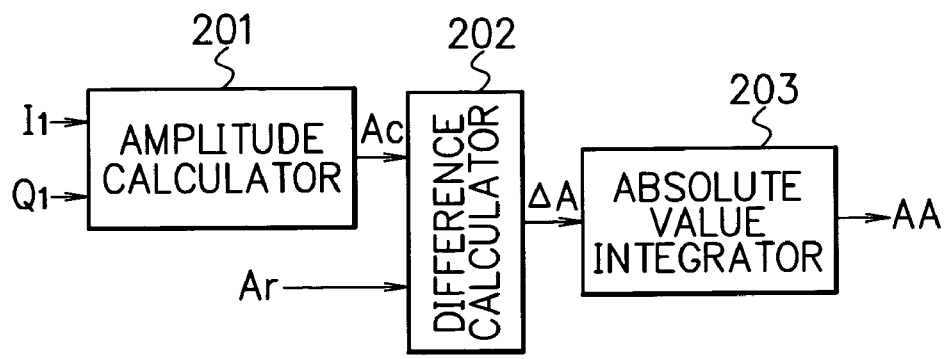
FIG. 2 is a diagram showing the configuration of a dispersion detector.
Figure 3A:
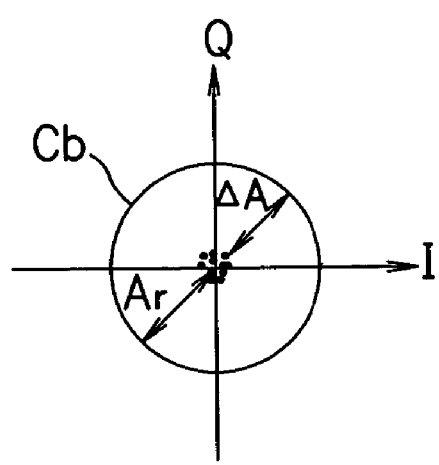
FIGS. 3A to 3D are views respectively showing an I-axis and a Q-axis coordinates.

FIG. 2 shows the configuration of the dispersion detector 105 (FIG. 1), and FIG. 3A shows I-axis and Q-axis coordinates. According to the inputted I-axis signal I1 and Q-axis signal Q1, coordinate values of FIG. 3A are determined. An amplitude calculator 201 calculates an amplitude Ac of a symbol comprising the I-axis signal I1 and the Q-axis signal Q1 by the following formula and outputs the calculated amplitude Ac. This amplitude Ac is equivalent to the size of each of the coordinate values of FIG. 3A.

$$Ac = (I1^2 + Q1^2)^{0.5}$$

A difference calculator 202 outputs the difference ΔA between the amplitude Ac and a reference amplitude Ar. The reference amplitude Ar is equivalent to the radius of reference circles Cb of FIG. 3A and FIGS. 15A to 15C. An absolute value integrator 203 integrates the absolute value of the difference ΔA, and outputs the dispersion AA that is an integrated value thereof.

In FIG. 1, the output signals I1 and Q1 of the timing reproducer 103 depend on the carrier frequency fRF and the symbol rate SR. When a channel of a frequency close to the carrier frequency fRF does not exist in the inputted PSK modulation signal IN, the quasi-synchronization quadrature detector 101 does not output the signals IA and QA, so that the signals I1 and Q1 do not depend on the symbol rate SR, and thus the constellation thereof centralizes in the vicinity of the origin as shown in FIG. 3A. Then, the amplitude Ac of each symbol becomes a smaller value as compared to the reference amplitude Ar, so that the value of the difference ΔA of the amplitude gets larger, and the output AA of the dispersion detector 105, which is obtained by integrating the difference ΔA, gets larger as well.

Figure 3B:
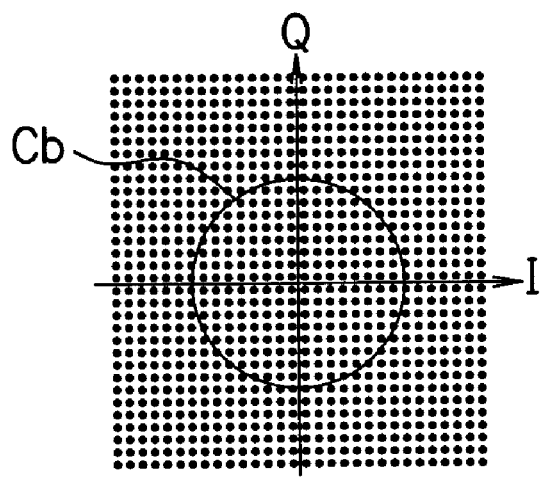

When the signal of a symbol rate close to the value of the symbol rate SR does not exist, as the carrier frequency fRF gets close to a channel carrier frequency existing in the inputted PSK modulation signal IN, the quasi-synchronization quadrature detector 101 starts to output the signals IA and QA, but the timing reproducer 103 does not lock, so that, as shown in FIG. 3B, coordinate values of the symbols are distributed randomly. Also in this case, the amplitude Ac of each symbol tends to be apart from the reference amplitude Ar, so that the value of the difference ΔA of the amplitude gets larger, and the output AA of the dispersion detector 105, which is obtained by integrating the difference ΔA, gets larger as well.

Figure 3C:
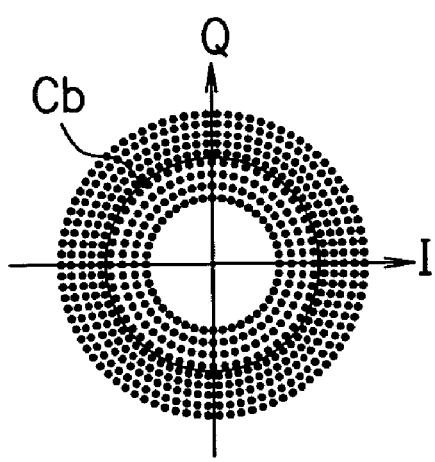
Figure 3D:
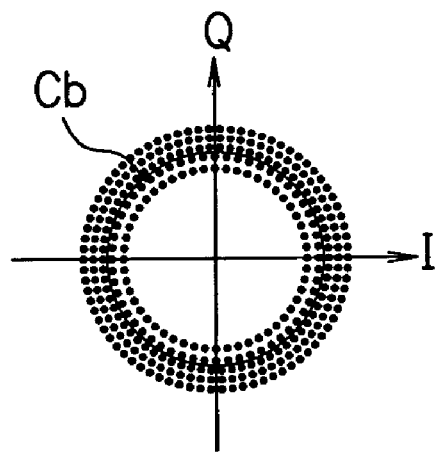

When the signal of a symbol rate close to the value of the symbol rate SR exists, as the carrier frequency fRF gets close to the carrier frequency of the channel thereof, the timing reproducer 103 locks, so that, as shown in FIG. 3C, coordinate values of the symbols are distributed in a donut shape in the vicinity of the reference circle Cb. In this case, the amplitude Ac of each symbol is quite close to the reference amplitude Ar, so that the value of the difference ΔA of the amplitude gets smaller, and the output AA of the dispersion detector 105, which is obtained by integrating the difference ΔA, gets smaller as well.

When the carrier frequency fRF further gets close from this state to the carrier frequency of the channel thereof, the constellation output of the timing reproducer 103 further gets close to the reference circle Cb of the reference amplitude Ar, so that the value of the difference ΔA of the amplitude further gets smaller, and the output AA of the dispersion detector 105, which is obtained by integrating the difference ΔA, further gets smaller as well.

Specifically, the output AA of the dispersion detector 105 is monitored under the condition that the symbol rate SR is fixed and the carrier frequency fRF of the quasi-synchronization quadrature detector 101 is varied. When a channel carrier frequency close to the channel carrier frequency under the set symbol rate SR does not exist, the output AA of the dispersion detector 105 remains large, and when the channel carrier frequency close to the channel carrier frequency under the set symbol rate SR exists, the output AA of the dispersion detector 105 becomes the smallest to be the minimum value when the carrier frequency fRF gets the closest to the channel carrier frequency.

An example that a PSK modulation signal IN is inputted as shown in FIG. 4A, in which four channels CH1 to CH4 of FIG. 12 exist will be explained. As shown in FIG. 4B, when the symbol rate SR is fixed close to S1 and the carrier frequency fRF is varied, the output AA of the dispersion detector 105 becomes the minimum value when the carrier frequency fRF is close to f1, so that existence of a first channel CH1 can be detected. Similarly, as shown in FIG. 4C, when the symbol rate SR is fixed close to S2 and the carrier frequency fRF is varied, the output AA of the dispersion detector 105 becomes the minimum value when the carrier frequency fRF is close to f2, so that existence of a second channel CH2 can be detected. Similarly, as shown in FIG. 4D, when the symbol rate SR is fixed close to S3 and the carrier frequency fRF is varied, the output AA of the dispersion detector 105 becomes the minimum value when the carrier frequency fRF is close to f3, so that existence of a third channel CH3 can be detected. Similarly, as shown in FIG. 4E, when the symbol rate SR is fixed close to S4 and the carrier frequency fRF is varied, the output AA of the dispersion detector 105 becomes the minimum value when the carrier frequency fRF is close to f4, so that existence of a fourth channel CH4 can be detected. As shown in FIG. 4F, when the symbol rate SR is fixed to a value that is close to none of S1, S2, S3, and S4 and the carrier frequency fRF is varied, the output AA of the dispersion detector 105 remains large and no minimum value appears, so that no existence of a channel can be detected.

Figure 5:
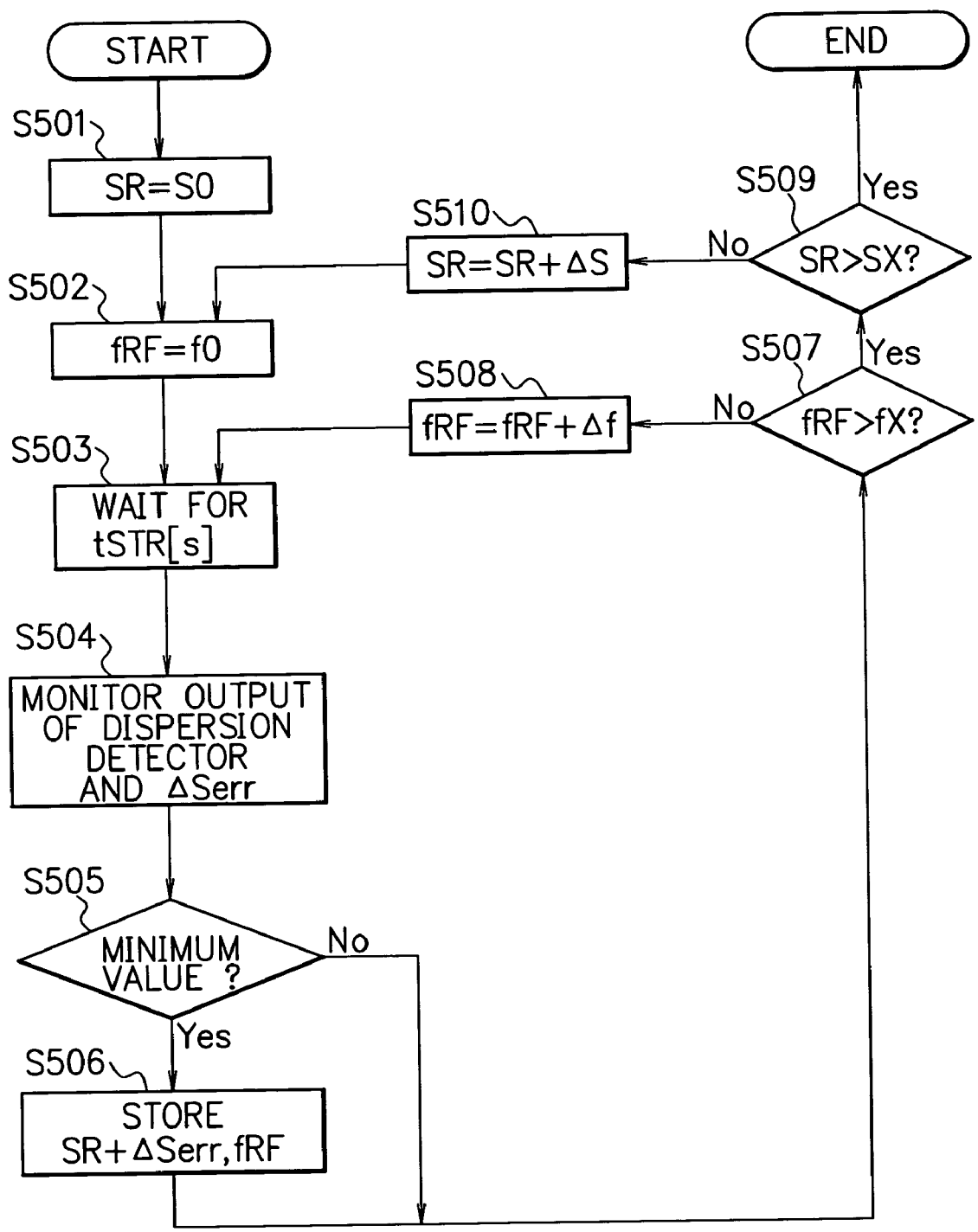
FIG. 5 is a flow chart showing processings of a channel search according to the first embodiment.

FIG. 5 is a flow chart showing processings of a channel search performed by the controller 121 (FIG. 1). First, in Step S501, the symbol rate SR is set to S0. The symbol rate S0 is the minimum value of a symbol rate setting. Next, in Step S502, the carrier frequency fFR is set to f0. The carrier frequency f0 is the minimum value of a carrier frequency setting. Next, in Step S503, the system stands by for a time tSTR(s).

Here, the time tSTR is the sum total of a time necessary for the timing reproducer 103 to complete timing reproduction, and a time until automatic gain control of the gain controller 104 locks. This time tSTR can be approximate to the time necessary for the timing reproducer 103 to complete timing reproduction.

If the difference between the symbol rate SR and the symbol rate of a channel is within a pull-in range of the timing reproducer 103, and the difference between the carrier frequency fRF and the carrier frequency of the channel is small, the timing reproducer 103 corrects the difference ΔSerr between the symbol rate SR and the actual symbol rate, so that the output value AA of the dispersion detector 105 becomes the minimum value. In other words, when the output AA of the dispersion detector 105 is the minimum value, it means that a channel exists, and when the output AA of the dispersion detector 105 is not the minimum value, it means that no channel exists.

Next, in Step S504, the output AA of the above-described dispersion detector 105 and the symbol rate displacement amount ΔSerr are monitored. Next, in Step S505, it is checked whether the output AA of the dispersion detector 105 is the minimum value or not. If it is the minimum value, the system proceeds to Step S506, and if it is not the minimum value, the system proceeds to Step S507. In Step S506, SR+ΔSerr as a symbol rate and fRF as a carrier frequency of which a channel exists are respectively stored in a memory.

Next, in Step S507, it is checked whether the carrier frequency fRF is larger than fX or not. The carrier frequency fX is the maximum value of the carrier frequency setting. If it is not larger, the system proceeds to Step S508, and if it is larger, the system proceeds to Step S509. In Step S508, a frequency variation Δf is added to the set value of the carrier frequency fRF. Thereafter, the system returns to Step S503, and repeats the above-described processings on a new carrier frequency fRF.

In Step S509, it is checked whether the symbol rate SR is larger than SX or not. The symbol rate SX is the maximum value of the symbol rate setting. If it is not larger, the system proceeds to Step S510, and if it is larger, the system terminates the processing. In Step S510, a symbol rate variation ΔS is added to the set value of the symbol rate SR. Thereafter, the system returns to Step S502, and repeats the above-described processings on a new symbol rate SR.

By this channel search, the carrier frequencies and the symbol rates for the four channels shown in FIG. 13, for example, can be obtained.

Incidentally, the output AA of the dispersion detector 105 is the integrated value of dispersion of each of the carrier frequency fRF and the symbol rate SR. When the set value of the carrier frequency fRF or the symbol rate SR is varied, the dispersion detector 105 is reset.

Figure 16:
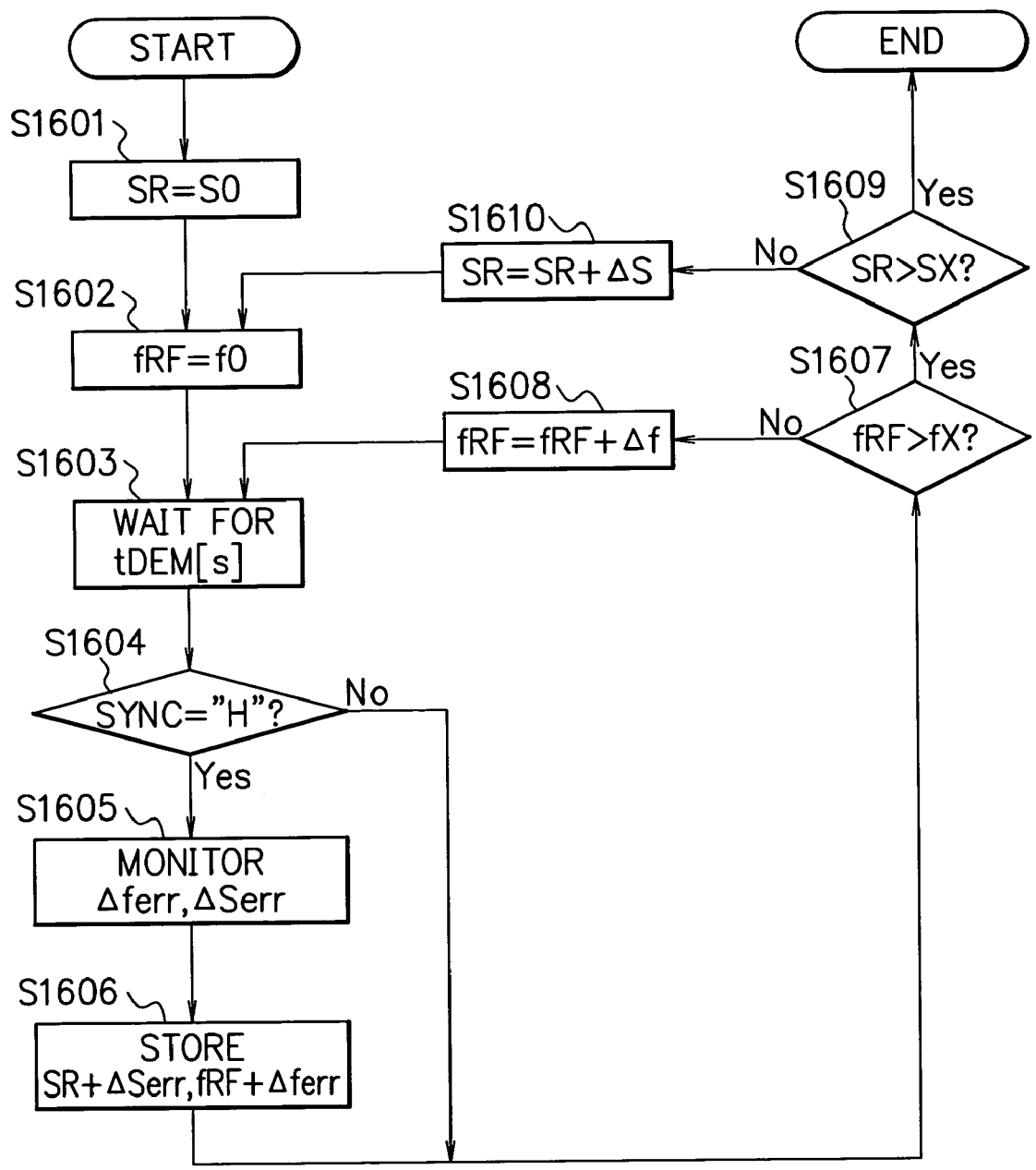
FIG. 16 is a flow chart showing processings of a channel search according to the prior art.

In a channel search of FIG. 16, a standby time in Step 1603 is tDEM. The standby time tDEM is the sum total of a time necessary for the timing reproducer 1403 to complete timing reproduction, a time necessary for the carrier reproducer 1405 to complete carrier reproduction, a time necessary for the error corrector 1406 to complete error correction, and a time necessary for the synchronization detector 1407 to complete synchronization detection.

In contrast, in the channel search according to the present invention, the standby time in Step S503 is tSTR. The standby time tSTR only includes the time necessary for the timing reproducer 103 to complete the timing reproduction, so that it is much shorter as compared to the standby time tDEM of FIG. 16. Therefore, according to this embodiment, the time until completing a channel search can be drastically reduced.

Second Embodiment

Figure 6:
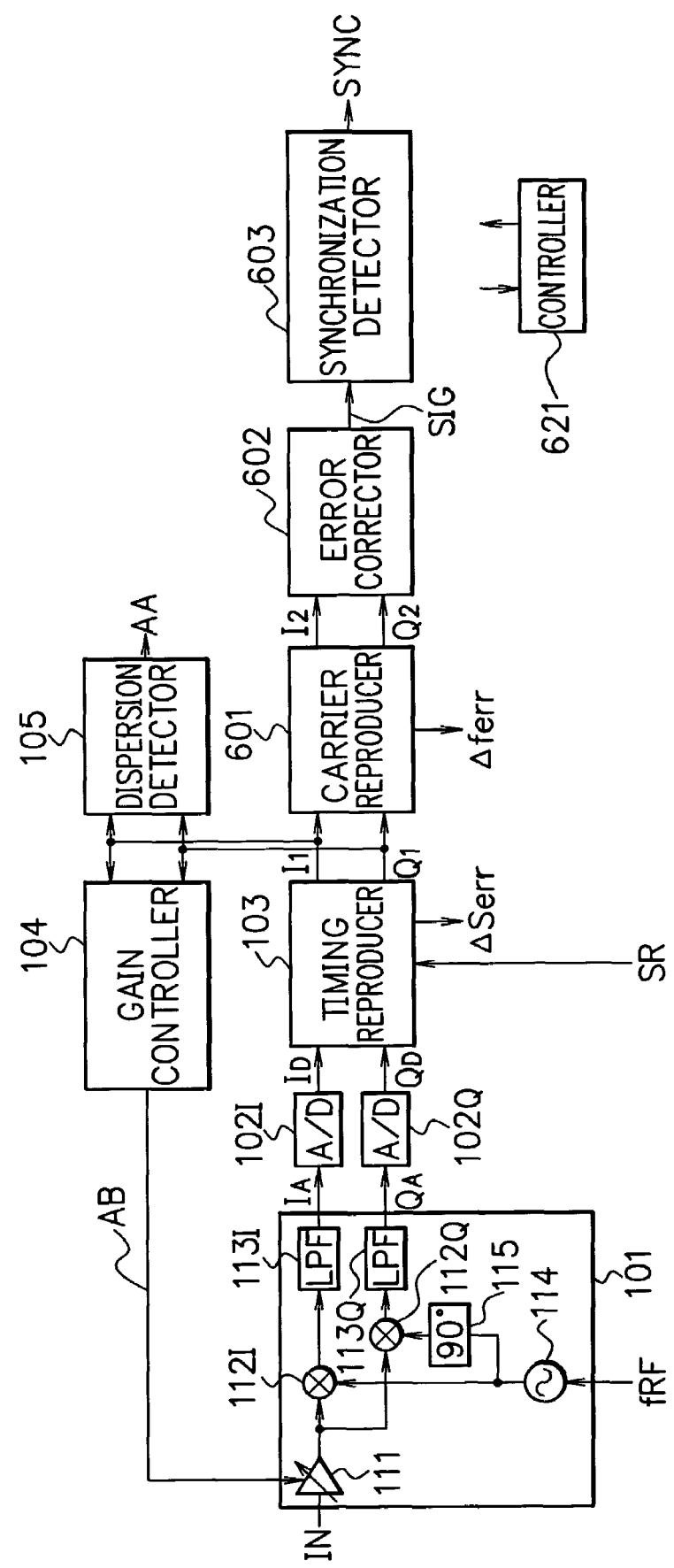
FIG. 6 is a diagram showing the configuration of a channel search device according to a second embodiment of the present invention.

FIG. 6 shows the configuration of a channel search device according to a second embodiment of the present invention. This channel search device also functions as a PSK demodulator. The channel search device of FIG. 6 is obtained by adding a carrier reproducer 601, an error corrector 602, and a synchronization detector 603 to the channel search device of FIG. 1. A controller 621 controls these constituent units. Hereinafter, the difference from the first embodiment will be explained. The other part is the same as the first embodiment.

The carrier reproducer 601 corrects a phase displacement of a symbol comprising an I-axis signal I1 and a Q-axis signal Q1, outputs an I-axis signal I2 and a Q-axis signal Q2, and outputs a displacement amount Δferr of a carrier frequency fRF.

The error corrector 602 corrects an error of a symbol comprising the I-axis signal I2 and the Q-axis signal Q2, and outputs a demodulation signal SIG.

The synchronization detector 603 performs detection of a unique word from a data row of the demodulation signal SIG, and outputs a high level as a synchronization signal SYNC when the unique word can be detected in a constant period, and outputs a low level when the unique word cannot be detected. For example, in the case of MPEG (Motion Picture Experts Group), the unique word is 47 h, and a combination of the unique word and a subsequent 187-byte data row is repeatedly inputted.

To select and demodulate respective channels CH1 to CH4, the above-described carrier frequency fRF and the symbol rate SR can be set to the values of FIG. 13 to obtain the demodulation signal SIG.

Figure 7:
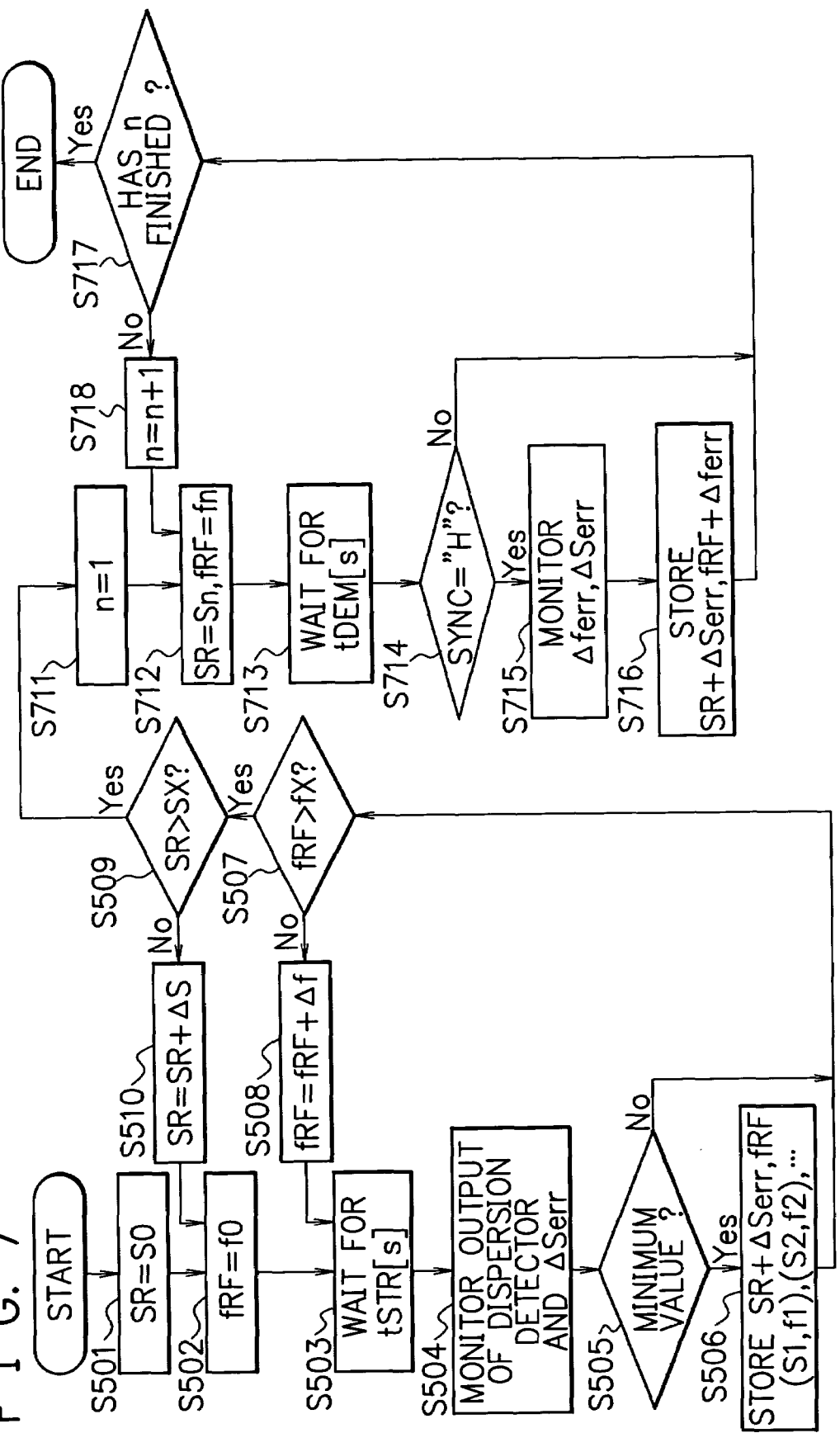
FIG. 7 is a flow chart showing processings of a channel search according to the second embodiment.

FIG. 7 is a flow chart showing processings of a channel search performed by the controller 621 (FIG. 6). The processings in Steps S501 to S510 are the same as the processings of FIG. 5. Incidentally, in Step S506, the symbol rate SR+ΔSerr of $n^{th}$ channel is stored as Sn, and the carrier frequency fRF of $n^{th}$ channel is stored as fn. For example, the symbol rate of a first channel is S1, and the carrier frequency of a first channel is f1. The processings after the symbol rate SR is judged to be larger than SX in Step S709 will be explained below.

In Step S711, the channel number n is set to 1. Next, in Step S712, the symbol rate Sn of the $n^{th}$ channel is set to the symbol rate SR, and the carrier frequency fn of the $n^{th}$ channel is set to the carrier frequency fRF. Next, in Step S713, the system stands by for a time tDEM(s) necessary for completing a demodulation processing.

Here, the standby time tDEM is the sum total of a time necessary for the timing reproducer 103 to complete timing reproduction, a time necessary for the carrier reproducer 601 to complete carrier reproduction, a time necessary for the error corrector 602 to complete error correction, and a time necessary for the synchronization detector 603 to complete synchronization detection.

When the difference between the symbol rate SR and the symbol rate of a channel is within a pull-in range of the timing reproducer 103, and the difference between the carrier frequency fRF and the carrier frequency of the channel is within a pull-in range of the carrier reproducer 601, the timing reproducer 103 corrects the difference ΔSerr between the symbol rate SR and the actual symbol rate, and the carrier reproducer 601 corrects the difference Δferr between the carrier frequency fRF and the carrier frequency of the actual channel, so that a synchronization signal SYNC becomes high level ("H"). However, during the processings in Steps S501 to S510, the symbol rates Sn and the carrier frequencies fn for all the channels are detected, and their values are set as the symbol rate SR and the carrier frequency fRF, so that the synchronization signal SYNC becomes high level in principle.

Next, in Step S714, it is checked whether the synchronization signal SYNC is high level or not. If it is high level, the system proceeds to Step S715, and if it is low level, the system proceeds to Step S717. In Step S715, the carrier frequency displacement amount Δferr of the carrier reproducer 601 and the symbol rate displacement amount ΔSerr of the timing reproducer 103 are monitored. Next, in Step S716, SR+ΔSerr as a symbol rate and fRF+Δferr as a carrier frequency of which the channel exists are respectively stored in a memory.

Next, in Step S717, it is checked whether the channel number n is larger than the number of all channels. The number of all channels is detected during the processings in Steps S501 to S510 and stored in the memory. If it is not larger than the number of all channels, the system proceeds to Step S718, and if it is larger, the system terminates the processing. In Step S718, increment is performed on the channel number n. Thereafter, the system returns to Step S712, and repeats the above-described processings on a new channel number n.

During the processings in Steps S501 to S510, the symbol rates SR+ΔSerr of all the channels can be detected as precise values, but the carrier frequencies fRF are detected as approximate values. Further, by performing the processings in Steps S711 to S718, precise symbol rates SR+ΔSerr and precise carrier frequencies fRF+Δferr for all the channels can be detected. In this case, the standby time tDEM in Step S713 is relatively longer, but the number of loops of Steps S712 to S718 is only the number of all the channels, which is quite smaller than the number of loops of FIG. 16. Therefore, the channel search time of this embodiment becomes very much shorter than the channel search time of FIG. 16.

Third Embodiment

Figure 8:
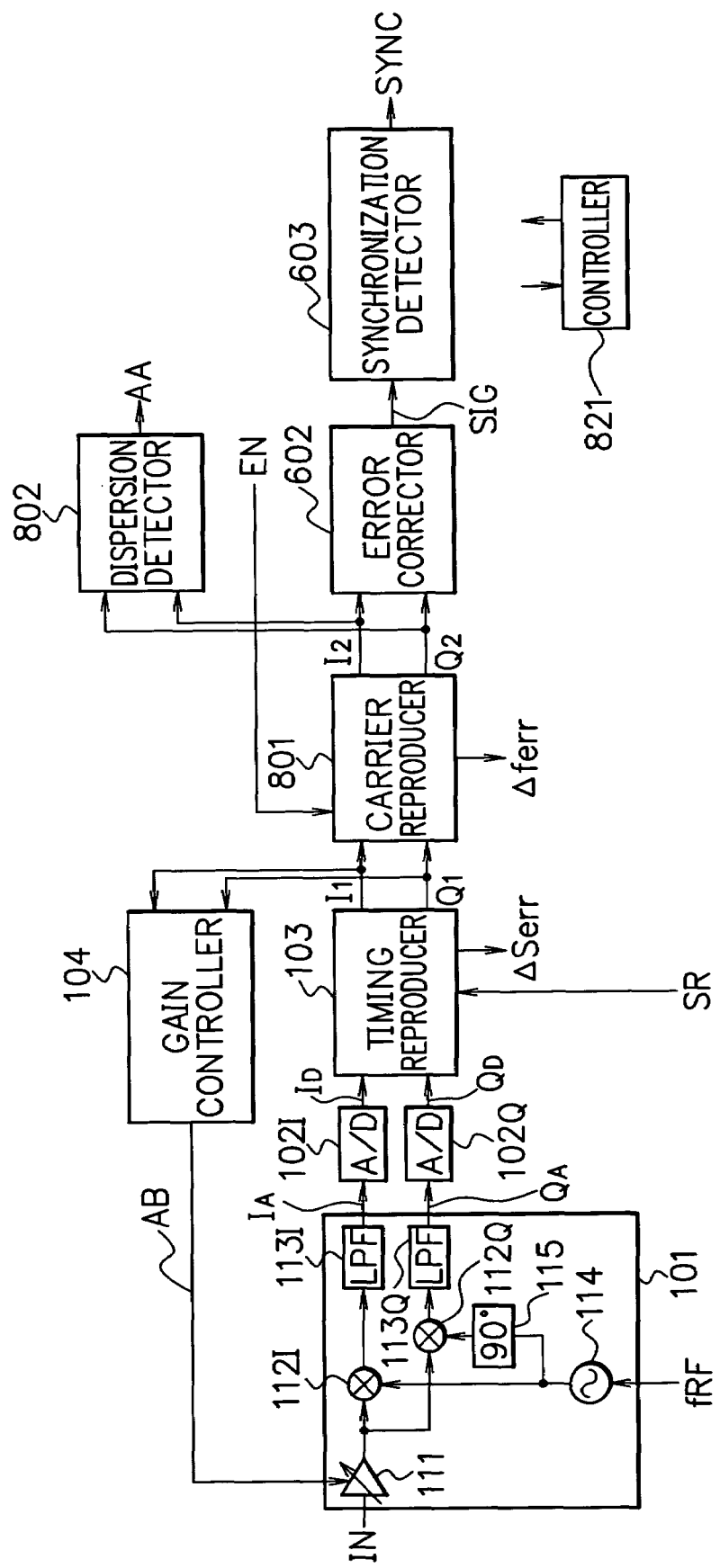
FIG. 8 is a diagram showing the configuration of a channel search device according to a third embodiment of the present invention.

FIG. 8 shows the configuration of a channel search device according to a third embodiment of the present invention. This channel search device also functions as a PSK demodulator. The channel search device of FIG. 8 is obtained by replacing the carrier reproducer 601 and the dispersion detector 105 in the channel search device of FIG. 6 with a carrier reproducer 801 and a dispersion detector 802. A controller 821 controls these constituent units. Hereinafter, the difference from the second embodiment will be explained. The other part is the same as the second embodiment.

When an enable signal EN is inputted, the carrier reproducer 801 corrects phase errors of an I-axis signal I1 and a Q-axis signal Q1 outputted by the timing reproducer 103 and outputs an I-axis signal I2 and a Q-axis signal Q2. If the enable signal EN is not inputted, the I-axis signal I1 and the Q-axis signal Q1 outputted by the timing reproducer are outputted as they are as the I-axis signal I2 and the Q-axis signal Q2.

The dispersion detector 802 inputs the I-axis signal I2 and the Q-axis signal Q2 outputted by the carrier reproducer 801, and integrates the absolute value of the difference between the amplitude of a symbol, comprising the inputted I-axis signal I2 and Q-axis signal Q2, and a reference amplitude to thereby output dispersion AA. Similarly to the first and second embodiments, the internal configuration of the dispersion detector 802 is shown in FIG. 2.

Figure 9:
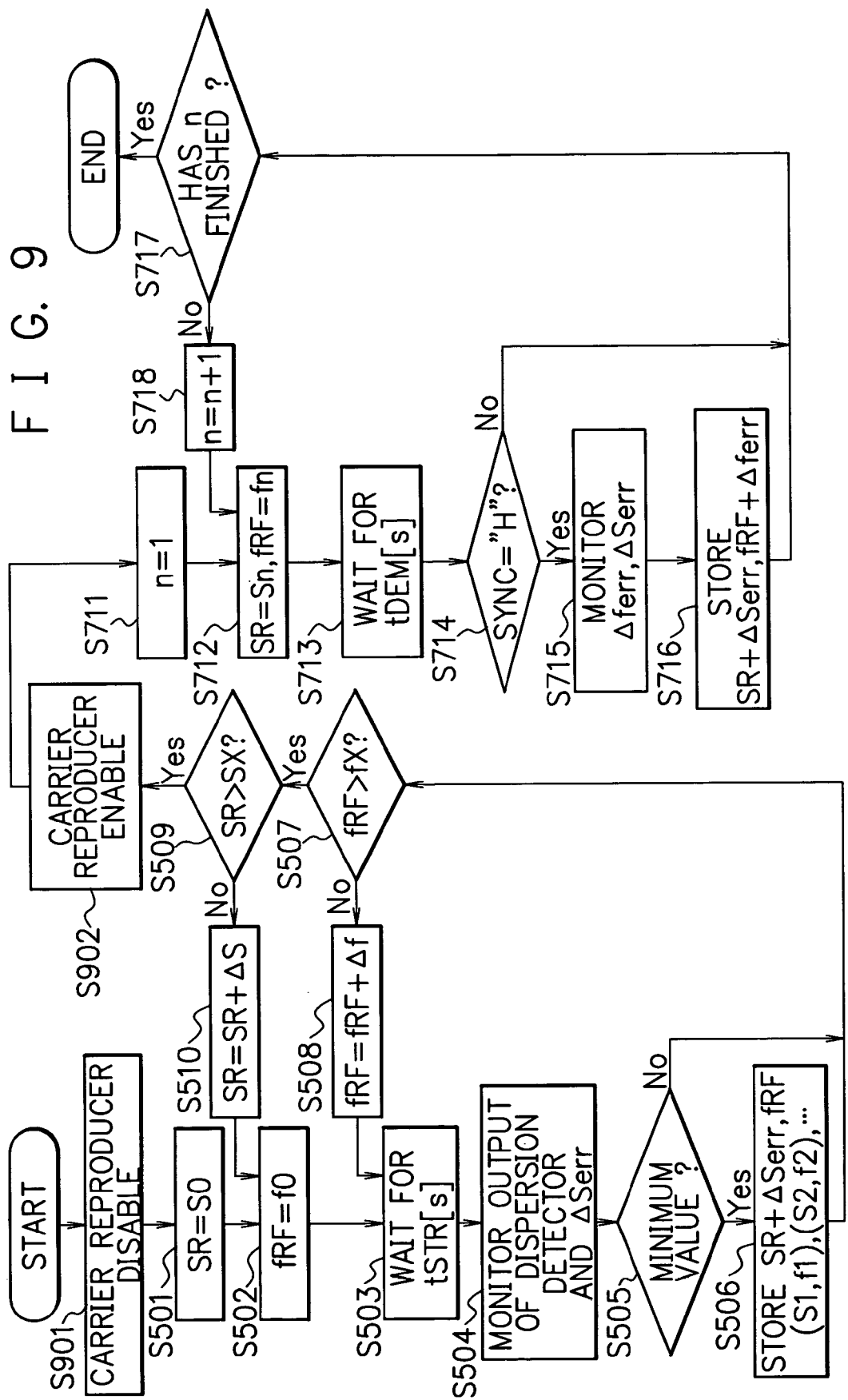
FIG. 9 is a flow chart showing processings of a channel search according to the third embodiment.

FIG. 9 is a flow chart showing processings of a channel search performed by the controller 821 (FIG. 8). This flow chart is basically the same as the flow chart of FIG. 7, and the difference therefrom will be explained below.

Step S901 is a processing performed prior to Step S501, which does not input the enable signal EN to the carrier reproducer 801 so that the carrier reproducer 801 is placed in a disabled state. In this state, the processings in Steps S501 to S510 are performed. Thus, the dispersion detector 802 becomes equivalent to inputting the I-axis signal I1 and the Q-axis signal Q1 of the timing reproducer 103, so that it is made to perform the same processing in the second embodiment.

Step S902 is a processing performed prior to Step S711, which inputs the enable signal EN to the carrier reproducer 801 so that the carrier reproducer 801 is placed in an enabled state. In this state, the processings in Steps S711 to S718 are performed. Thus, the error corrector 602 becomes equivalent to inputting the I-axis signal I2 and the Q-axis Q2 whose phases are corrected by the carrier reproducer 801, so that it is made to perform the same processing in the second embodiment.

After the above-described channel search is terminated, the enable signal EN is inputted to the carrier reproducer 801 when selecting a channel. The selection of a channel can be performed by setting the carrier frequency fRF and the symbol rate SR for each channel.

A PSK modulation signal IN is inputted in the channel search device (PSK modulator) of FIG. 8 by reception of digital satellite broadcasting with an antenna for example. While adjusting the direction of the antenna according to the position of a satellite, C/N (carrier to noise) detection is performed. A position of the antenna where the noise in the PSK modulation signal IN becomes small is the appropriate position. During the C/N detection, the enable signal EN is inputted to the carrier reproducer 801, and the dispersion detector 802 inputs the signals I2 and Q2 whose phases are corrected by the carrier reproducer 801.

Figure 10A:
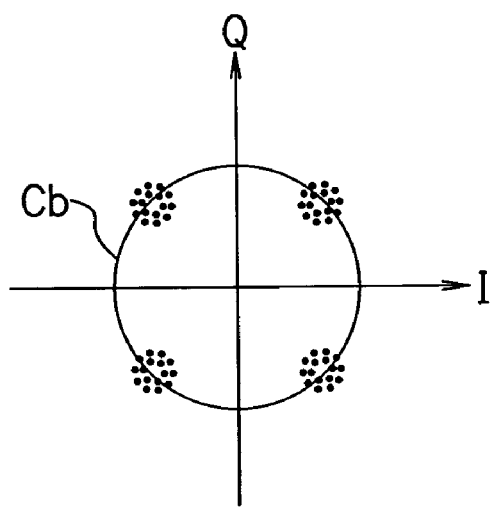
FIGS. 10A and 10B are views respectively showing an I-axis and a Q-axis coordinates.
Figure 10B:
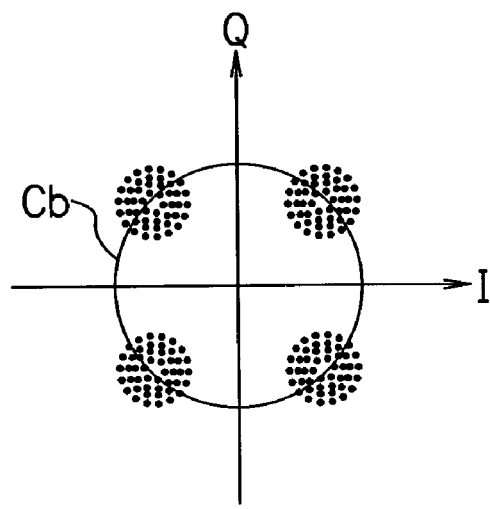
Figure 14:
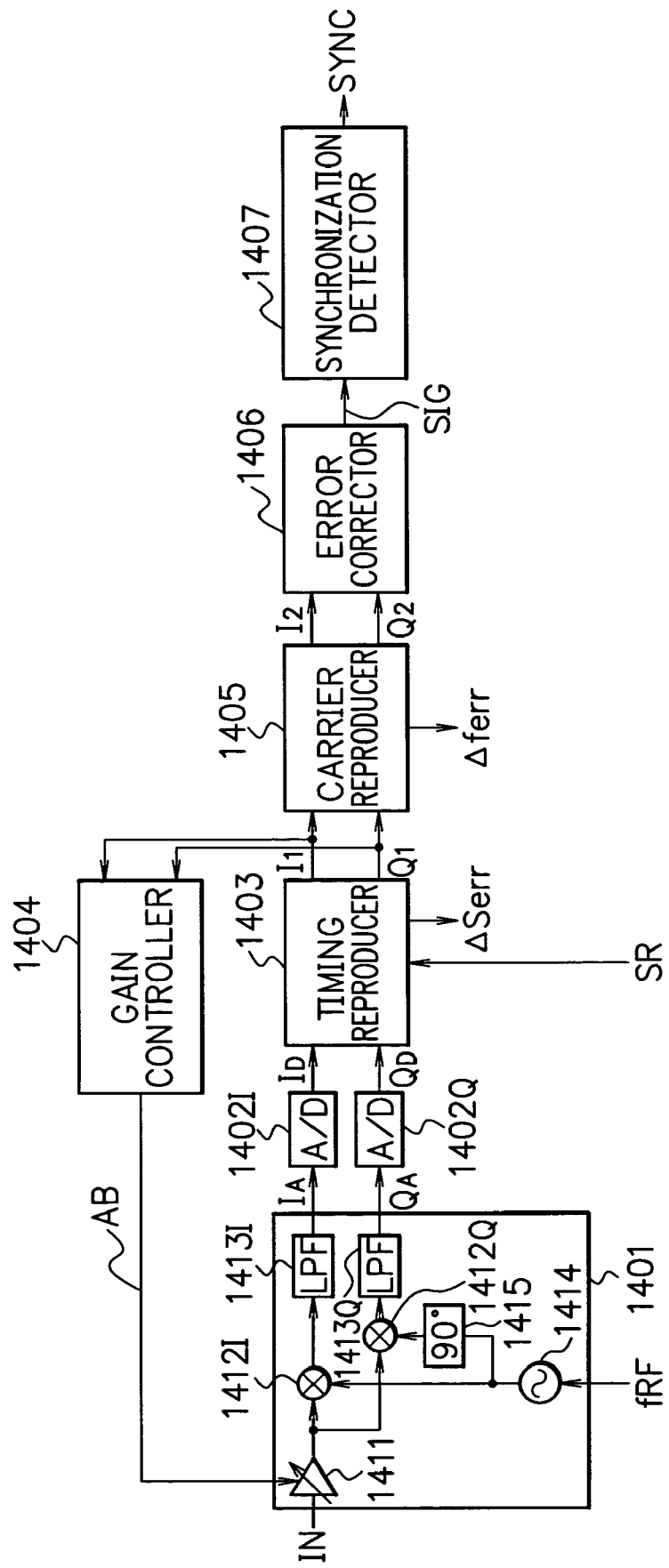
FIG. 14 is a diagram showing the configuration of a channel search device according to a prior art.

FIGS. 10A and 10B show symbol distributions comprising the I-axis signal I2 and the Q-axis signal Q2 whose phases are corrected. When there is no noise, a distribution of four points appears as shown in FIG. 15A. FIG. 10A is a distribution when the C/N is high (the noise is small), which makes dispersion of each point small. FIG. 10B is a distribution when the C/N is low (the noise is large), which makes dispersion of each point large. The lower the C/N is, the larger the output AA of the dispersion detector 802 becomes, which enables the dispersion detector 802 to detect the C/N of the received PSK modulation signal IN. In other words, noise of the PSK modulation signal IN can be detected.

In contrast, as shown in FIG. 6, when the output signals I1 and Q1 of the timing reproducer 103 are inputted in the dispersion detector 105, the output AA of the dispersion detector 105 depends on the displacement amount Δferr of the carrier frequency fRF even under the same C/N, so that it is impossible to detect the C/N.

Fourth Embodiment

FIG. 11 shows the configuration of a channel search device according to a fourth embodiment of the present invention. This channel search device also functions as a PSK demodulator. The channel search device of FIG. 11 is obtained by replacing the gain controller 104 and the dispersion detector 802 of the channel search device of FIG. 8 with a gain controller 1101 and a dispersion detector 1102. A controller 1121 controls these constituent units. Hereinafter, the difference from the third embodiment will be explained. The other part is the same as the third embodiment.

The gain controller 1101 includes an amplitude calculator 1111, a difference calculator 1112, and a positive/negative values integrator 1113. The dispersion detector 1102 includes the amplitude calculator 1111, the difference calculator 1112, and an absolute value integrator 1114. The gain controller 1101 and the dispersion detector 1102 share the amplitude calculator 1111 and the difference calculator 1112. The configuration can thus be simplified, and reduction of the circuit scale can be realized.

In the dispersion detector 1102, the amplitude calculator 1111, the difference calculator 1112, and the absolute value integrator 1114 are respectively the same as the amplitude calculator 201, the difference calculator 202, and the absolute value integrator 203 of FIG. 2. In other words, the dispersion detector 1102 has the same internal configuration as that of the dispersion detector 802 of FIG. 8.

Next, operation of the gain controller 1101 will be explained. The amplitude calculator 1111 calculates and outputs an amplitude Ac of a symbol comprising an I-axis signal I2 and a Q-axis signal Q2. The difference calculator 1112 outputs the difference ΔA between the amplitude Ac and a reference amplitude Ar. The positive/negative values integrator 1113 integrates positive/negative values of the difference ΔA (integrates by adding positive/negative values) to thereby output a gain control signal AB that is an integrated value thereof to an amplifier 111. In other words, the gain controller 1101 controls the gain of the amplifier 111 so as to make the average amplitude of the symbol get close to the reference amplitude Ar.

As shown in FIG. 11, the gain controller 1101 may perform gain control by inputting the signals I2 and Q2 whose phases are corrected by the carrier reproducer 801, or as shown in FIG. 8, the gain controller 104 may perform gain control by inputting the signals I1 and Q1 outputted by the timing reproducer 103. Further, the gain controller 104 may perform gain control by inputting output signals ID and QD of the A/D converters 102I and 102Q. This can be applied to the first to fourth embodiments.

Fifth Embodiment

In a fifth embodiment of the present invention, the variation ΔS in the first to fourth embodiments (in Step S510 of FIG. 5 or the like) for varying the set value of the symbol rate SR is varied according to the value of the symbol rate SR. Since the pull-in range of the timing reproducer 103 is proportional to the symbol rate SR, the variation ΔS for varying the symbol rate SR can be large when the symbol rate SR is high. In other words, the pull-in range of the timing reproducer 103 is within the range of a predetermined proportion of the value of the symbol rate SR. Therefore, when the symbol rate SR becomes high, the pull-in range of the timing reproducer 103 becomes wide, so that the variation ΔS can be large. It is thus possible to shorten the time for performing the channel search while varying the symbol rate SR.

Sixth Embodiment

In a sixth embodiment of the present invention, the variation Δf in the first to fifth embodiments (in Step S508 of FIG. 5 or the like) for varying the carrier frequency fRF is varied according to the value of the symbol rate SR. Since the pull-in range of the carrier reproducer 601 or the like is proportional to the symbol rate SR, the precision of a resulting carrier frequency may be low when the symbol rate SR is high, so that the variation Δf for varying the carrier frequency fRF can be large. It is thus possible to shorten the time for performing the channel search while varying the carrier frequency fRF. For example, in FIG. 4A, since the channel CH3 has a symbol rate S3 that is high, its bandwidth with a carrier frequency f3 at the center is wide, so that the variation Δf can be large. On the other hand, since the channel CH4 has a symbol rate S4 that is low, its bandwidth with a carrier frequency f4 at the center is narrow, so that it is necessary to make the variation Δf small.

Seventh Embodiment

In a seventh embodiment of the present invention, the period tSTR in the first to sixth embodiments (in Step S503 of FIG. 5 or the like) for monitoring the value of the dispersion detector 105 or the like is set according to the symbol rate SR. Since times required for the timing reproducer 105 or the like and the gain controller 104 or the like to converge get shorter as the symbol rate SR gets higher, the frequency tSTR for monitoring the value of the dispersion detector 105 or the like can be short when the symbol rate SR is high, so that it is possible to shorten the time for performing the channel search while varying the symbol rate SR and the carrier frequency fRF.

According to the above-described first to seventh embodiments, the dispersion of the dispersion detector is monitored while varying the carrier frequency set value and the symbol rate set value, and when the size of the dispersion detected by the dispersion detector becomes an extremal value, it is judged that the channel of the symbol rate set value at the present time exists at the position of the carrier frequency set value thereof.

Since it is possible to judge that the channel exists when the size of the dispersion between the amplitude, comprising the I-axis signal and the Q-axis signal reproduced by the timing reproducer, and the reference amplitude becomes an extremal value, the channel search can be performed in a short period of time. The standby time required for judging whether the channel exists or not in a predetermined carrier frequency and symbol rate is only the time necessary for the timing reproducer to complete timing reproduction. As compared to the standby time of FIG. 16, which is the sum total of the time necessary for the timing reproducer to complete timing reproduction, the time necessary for the carrier reproducer to complete carrier reproduction, the time necessary for the error corrector to complete error correction, and the time necessary for the synchronization detector to complete synchronization detection, the first to seventh embodiments allow considerable reduction of the channel search time.

As has been described above, since it is possible to judge that the channel exists when the size of the dispersion between the amplitude, comprising the I-axis signal and the Q-axis signal reproduced by the timing reproducer, and the reference amplitude becomes an extremal value, the channel search can be performed in a short period of time. The standby time required for judging whether the channel exists or not in a predetermined carrier frequency and symbol rate is only the time necessary for the timing reproducer to complete the timing reproduction. As compared to the conventional standby time, which is the sum total of the time necessary for the timing reproducer to complete timing reproduction, the time necessary for the carrier reproducer to complete carrier reproduction, the time necessary for the error corrector to complete error correction, and the time necessary for the synchronization detector to complete synchronization detection, the present invention allows considerable reduction of the channel search time.

It should be noted that the present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A channel search device, comprising:
   a quasi-synchronization quadrature detector for inputting a PSK modulation signal and a carrier frequency set value, and outputting an I-axis signal and a Q-axis signal obtained by performing, based on the carrier frequency set value, quasi-synchronization quadrature detection on the PSK modulation signal;
   a timing reproducer for inputting the I-axis signal, the Q-axis signal, and a symbol rate set value, and reproducing and outputting the I-axis signal and the Q-axis signal while correcting an error of the symbol rate set value;
   a dispersion detector for inputting the I-axis signal and the Q-axis signal outputted by said timing reproducer, and detecting and outputting a dispersion between an amplitude of a symbol, comprising the I-axis signal and the Q-axis signal, and a reference amplitude; and a judging unit for monitoring the dispersion while varying the carrier frequency set value and the symbol rate set value, and judging that a channel exists at a position of a current symbol rate set value and a current carrier frequency set value when the size of the dispersion detected by said dispersion detector becomes an extremal value.

2. The channel search device according to claim 1, further comprising:

an A/D converter for converting the I-axis signal and the Q-axis signal outputted by said quasi-synchronization quadrature detector respectively from an analog format to a digital format, wherein said timing reproducer reproduces the I-axis signal and the Q-axis signal in digital formats.

3. The channel search device according to claim 2, wherein said timing reproducer reproduces and outputs the I-axis signal and the Q-axis signal while correcting the error of the symbol rate set value and outputs a displacement amount of the symbol rate, and wherein said judging unit judges that a channel exists at a position of the symbol rate when the size of the dispersion becomes an extremal value and at a position of the symbol rate according to the displacement amount outputted by said timing reproducer.

4. The channel search device according to claim 3, further comprising:

a gain controller for outputting a gain control signal according to the difference between the amplitude of the symbol, comprising the I-axis signal and the Q-axis signal outputted by said A/D converter or by said timing reproducer, and the reference amplitude, wherein said quasi-synchronization quadrature detector amplifies an input of the PSK modulation signal according to the gain control signal.

5. The channel search device according to claim 1, wherein said timing reproducer reproduces and outputs the I-axis signal and the Q-axis signal while correcting the error of the symbol rate set value and outputs a displacement amount of the symbol rate, and wherein said judging unit judges that a channel exists at a position of the symbol rate when the size of the dispersion becomes an extremal value and at a position of the symbol rate according to the displacement amount outputted by said timing reproducer.

6. The channel search device according to claim 1, further comprising:

a gain controller for outputting a gain control signal according to the difference between the amplitude of the symbol, comprising the I-axis signal and the Q-axis signal outputted by said timing reproducer, and the reference amplitude, wherein said quasi-synchronization quadrature detector amplifies an input of the PSK modulation signal according to the gain control signal.

7. The channel search device according to claim 1, further comprising:

a carrier reproducer for correcting phase errors of the I-axis signal and the Q-axis signal outputted by said timing reproducer, and outputting a displacement amount of the carrier frequency set value;

an error corrector for correcting an error of a symbol comprising the I-axis signal and the Q-axis signal corrected by said carrier reproducer; and a synchronization detector for detecting a synchronization by detecting a unique word from a data row of the symbol whose error is corrected by said error corrector, wherein said judging unit, after the judgment, outputs the carrier frequency set value and the symbol rate set value of which the channel exists to said quasi-synchronization quadrature detector and said timing reproducer, and judges that a channel exists at a position of the symbol rate of the symbol rate set value and the carrier frequency according to the carrier frequency set value and the displacement amount outputted by said carrier reproducer when said synchronization detector detects the synchronization.

8. The channel search device according to claim 7, further comprising:

an A/D converter for converting the I-axis signal and the Q-axis signal outputted by said quasi-synchronization quadrature detector respectively from an analog format to a digital format, wherein said timing reproducer reproduces the I-axis signal and the Q-axis signal in digital formats.

9. The channel search device according to claim 8, wherein said timing reproducer reproduces and outputs the I-axis signal and the Q-axis signal while correcting the error of the symbol rate set value and outputs a displacement amount of the symbol rate, and wherein said judging unit judges that a channel exists at a position of the symbol rate when the size of the dispersion becomes an extremal value and at a position of the symbol rate according to the displacement amount outputted by said timing reproducer.

10. The channel search device according to claim 9, further comprising:

a gain controller for outputting a gain control signal according to the difference between the amplitude of a symbol, comprising the I-axis signal and the Q-axis signal outputted by said A/D converter, by said timing reproducer, or by said carrier reproducer, and the reference amplitude, wherein said quasi-synchronization quadrature detector amplifies an input of the PSK modulation signal according to the gain control signal.

11. The channel search device according to claim 7, wherein said dispersion detector performs a channel search, when said judging unit judges the existence of a channel, by inputting the I-axis signal and the Q-axis signal outputted by said timing reproducer and detecting the dispersion between the amplitude of the symbol, comprising the I-axis signal and the Q-axis signal, and the reference amplitude, and detects noise, when noise detection is instructed, by inputting the I-axis signal and the Q-axis signal corrected by said carrier reproducer and detecting the dispersion between the amplitude of the symbol, comprising the I-axis signal and the Q-axis signal, and the reference amplitude.

12. The channel search device according to claim 7, wherein said carrier reproducer corrects, when an enable signal is inputted, phase errors of the I-axis signal and the Q-axis signal outputted by said timing reproducer and outputs the corrected signals, and outputs, when the enable signal is not inputted, the I-axis signal and the Q-axis signal outputted by said timing reproducer as they are, wherein said dispersion detector inputs the output of said carrier reproducer, and integrates the absolute value of the difference between the amplitude of an inputted symbol and the reference amplitude, and wherein said judging unit monitors the dispersion detected by said dispersion detector while varying the carrier frequency set value and the symbol rate set value in a state that the enable signal is not inputted to said carrier reproducer, judges that a channel exists at a position of a current symbol rate set value and a current carrier frequency set value when the size of the dispersion becomes an extremal value, thereafter outputs the carrier frequency set value and the symbol rate set value of which the channel exists to said quasi-synchronization quadrature detector and said timing reproducer in a state that the enable signal is inputted to said carrier reproducer, and judges that a channel exists at a position of the symbol rate of the symbol rate set value and the carrier frequency according to the carrier frequency set value and to the displacement amount outputted by said carrier reproducer when said synchronization detector detects the synchronization.

13. The channel search device according to claim 12, wherein said dispersion detector inputs, when noise detection is activated, the I-axis signal and the Q-axis signal corrected by said carrier reproducer in a state that the enable signal is inputted to said carrier reproducer, and detects noise by detecting the dispersion between the amplitude of the symbol, comprising the I-axis signal and the Q-axis signal, and the reference amplitude.

14. The channel search device according to claim 13, wherein the noise detection is C/N detection.

15. The channel search device according to claim 14, further comprising:
an A/D converter for converting the I-axis signal and the Q-axis signal outputted by said quasi-synchronization quadrature detector respectively from an analog format to a digital format,
wherein said timing reproducer reproduces the I-axis signal and the Q-axis signal in digital formats.

16. The channel search device according to claim 15, wherein said timing reproducer reproduces and outputs the I-axis signal and the Q-axis signal while correcting the error of the symbol rate set value and outputs a displacement amount of the symbol rate, and
wherein said judging unit judges that a channel exists at the position of the symbol rate when the size of the dispersion becomes an extremal value and at the position of the symbol rate according to the displacement amount outputted by said timing reproducer.

17. The channel search device according to claim 16, further comprising:
a gain controller for outputting a gain control signal according to the difference between the amplitude of the symbol, comprising the I-axis signal and the Q-axis signal outputted by said A/D converter, by said timing reproducer, or by said carrier reproducer, and the reference amplitude,
wherein said quasi-synchronization quadrature detector amplifies an input of the PSK modulation signal according to the gain control signal.

18. The channel search device according to claim 1, wherein said judging unit varies a variation of the symbol rate set value according to the symbol rate set value.

19. The channel search device according to claim 1, wherein said judging unit varies a variation for varying the carrier frequency set value according to the symbol rate set value.

20. The channel search device according to claim 1, wherein said judging unit sets, according to the symbol rate set value, a period for monitoring a dispersion value detected by said dispersion detector while varying the carrier frequency set value and the symbol rate set value.

21. A channel search device, comprising:
a quasi-synchronization quadrature detector for inputting a PSK modulation signal and a carrier frequency set value, and outputting an I-axis signal and a Q-axis signal obtained by performing, based on the carrier frequency set value, quasi-synchronization quadrature detection on the PSK modulation signal;
a timing reproducer for inputting the I-axis signal, the Q-axis signal, and a symbol rate set value, and reproducing and outputting the I-axis signal and the Q-axis signal while correcting an error of the symbol rate set value;
a carrier reproducer for correcting phase errors of the I-axis signal and the Q-axis signal outputted by said timing reproducer, and outputting a displacement amount of the carrier frequency set value;
an amplitude comparator to which the output of said carrier reproducer is inputted, for outputting the difference between an amplitude of an inputted symbol and a reference amplitude;
a gain controller for generating a gain control signal for amplifying the PSK modulation signal inputted to said quasi-synchronization quadrature detector by integrating positive/negative values of an output of said amplitude comparator;
a dispersion detector for detecting and outputting a dispersion between the amplitude of the symbol and the reference amplitude by integrating the absolute value of the output of said amplitude comparator;
an error corrector for correcting an error of a symbol comprising the I-axis signal and the Q-axis signal corrected by said carrier reproducer;
a synchronization detector for detecting a synchronization by detecting a unique word from a data row of the symbol whose error is corrected by said error corrector; and
a judging unit for monitoring the dispersion detected by said dispersion detector while varying the carrier frequency set value and the symbol rate set value in a state that an enable signal is not inputted to said carrier reproducer, judging that a channel exists at a position of a current symbol rate set value and a current carrier frequency set value when the size of the dispersion becomes an extremal value, thereafter outputting the carrier frequency set value and the symbol rate set value of which the channel exists to said quasi-synchronization quadrature detector and said timing reproducer in a state that the enable signal is inputted to said carrier reproducer, and judging that a channel exists at a position of the symbol rate of the symbol rate set value and the carrier frequency according to the carrier frequency set value and to the displacement amount outputted by said carrier reproducer when said synchronization detector detects the synchronization.

22. The channel search device according to claim 21, further comprising:
an A/D converter for converting the I-axis signal and the Q-axis signal outputted by said quasi-synchronization quadrature detector respectively from an analog format to a digital format,
wherein said timing reproducer reproduces the I-axis signal and the Q-axis signal in digital formats.

23. The channel search device according to claim 22, wherein said timing reproducer reproduces and outputs the I-axis signal and the Q-axis signal while correcting the error of the symbol rate set value and outputs a displacement amount of the symbol rate, and wherein said judging unit judges that a channel exists at the position of the symbol rate when the size of the dispersion becomes an extremal value and at the position of the symbol rate according to the displacement amount outputted by said timing reproducer.

* * * * *